(12) United States Patent
Nelsen et al.

(10) Patent No.: US 12,301,580 B2
(45) Date of Patent: *May 13, 2025

(54) EFFICIENT AND SECURE AUTHENTICATION SYSTEM

(71) Applicant: Visa International Service Association, San Francisco, CA (US)

(72) Inventors: Mark Nelsen, Oakland, CA (US); David William Wilson, Camberley (GB); Guido Mangiagalli, London (GB); Anjana Neera Surin, Foster City, CA (US); Sayeed Mohammed, Foster City, CA (US); Alan Johnson, Herriman, UT (US); Phillip Lavender, Foster City, CA (US); Glenn Powell, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/947,759

(22) Filed: Sep. 19, 2022

(65) Prior Publication Data
US 2023/0009884 A1 Jan. 12, 2023

Related U.S. Application Data

(63) Continuation of application No. 17/049,225, filed as application No. PCT/US2019/028880 on Apr. 24, 2019, now Pat. No. 11,496,481.
(Continued)

(51) Int. Cl.
*H04L 9/40* (2022.01)
*G06F 16/24* (2019.01)
(Continued)

(52) U.S. Cl.
CPC ............ *H04L 63/102* (2013.01); *G06F 16/24* (2019.01); *G06F 21/31* (2013.01); *G06Q 20/40* (2013.01);
(Continued)

(58) Field of Classification Search
CPC ...... H04L 63/083; H04L 63/102; G06F 21/31
See application file for complete search history.

(56) References Cited

U.S. PATENT DOCUMENTS 7,991,701 B2 8/2011 Weller et al.
8,887,245 B1 * 11/2014 Wiltzius ................ H04L 63/04
726/4
(Continued)

FOREIGN PATENT DOCUMENTS

CN 1726519 A 1/2006
CN 104205144 A 12/2014
(Continued)

OTHER PUBLICATIONS

S. H. Qatinah and I. A. Al-Baltah, "Kerberos Protocol: Security Attacks and Solution," 2024 1st International Conference on Emerging Technologies for Dependable Internet of Things (ICETI), Sana'a, Yemen, 2024, pp. 1-7. (Year: 2024).*
(Continued)

*Primary Examiner* — Kari L Schmidt
(74) *Attorney, Agent, or Firm* — Kilpatrick Townsend & Stockton LLP

(57) ABSTRACT

An authentication request message from a user conducting an interaction at a resource provider computer is received. It is determined that data representing an indication that the resource provider is trusted by the user and including a trusted marker is present in a database. Authentication to the user is provided, and information indicating that the user has been authenticated and the trusted marker are sent so that
(Continued)

authorization request message for the interaction that includes the trusted marker is generated. The trusted marker is validated, and the authorization request message including information related to the interaction and the validated trusted marker is sent to an authorizing entity computer.

20 Claims, 11 Drawing Sheets

Related U.S. Application Data

(60) Provisional application No. 62/728,303, filed on Sep. 7, 2018, provisional application No. 62/662,648, filed on Apr. 25, 2018, provisional application No. 62/662,134, filed on Apr. 24, 2018.

(51) Int. Cl.
  *G06F 21/31* (2013.01)
  *G06Q 20/40* (2012.01)

(52) U.S. Cl.
  CPC .... *H04L 63/083* (2013.01); *G06F 2221/2113* (2013.01); *H04L 2463/082* (2013.01)

(56) References Cited

U.S. PATENT DOCUMENTS

| | | | |
|---|---|---|---|
| 9,769,134 | B2 | 9/2017 | Dominguez et al. |
| 10,089,683 | B2 | 10/2018 | Dominguez |
| 10,460,382 | B2 | 10/2019 | Dominguez |
| 10,742,419 | B2 | 8/2020 | Lavender et al. |
| 10,861,042 | B2 | 12/2020 | Khvostov et al. |
| 11,502,839 | B1* | 11/2022 | Sundar .................. H04L 9/14 |
| 11,805,127 | B1* | 10/2023 | Sundar ............... H04L 63/0884 |
| 2006/0253583 | A1* | 11/2006 | Dixon ................... H04L 67/02 709/225 |
| 2010/0100958 | A1* | 4/2010 | Jeremiah .............. G06F 21/36 726/22 |
| 2010/0257102 | A1* | 10/2010 | Perlman ................ G06Q 30/06 705/44 |
| 2011/0196791 | A1 | 8/2011 | Dominguez |
| 2012/0066129 | A1 | 3/2012 | Dominguez et al. |
| 2012/0116976 | A1 | 5/2012 | Hammad et al. |
| 2012/0323734 | A1 | 12/2012 | Dominguez et al. |
| 2013/0018793 | A1 | 1/2013 | Wong et al. |
| 2014/0058948 | A1 | 2/2014 | Dominguez et al. |
| 2014/0074724 | A1 | 3/2014 | Gordon et al. |
| 2014/0282974 | A1 | 9/2014 | Maher et al. |
| 2015/0019443 | A1 | 1/2015 | Sheets et al. |
| 2015/0379515 | A1 | 12/2015 | Hammad et al. |
| 2016/0134660 | A1* | 5/2016 | Ponsini .................. H04L 63/20 726/1 |
| 2016/0239859 | A1 | 8/2016 | Yen |
| 2017/0039568 | A1 | 2/2017 | Tunnell et al. |
| 2017/0076288 | A1 | 3/2017 | Awasthi |
| 2017/0091772 | A1 | 3/2017 | Piel et al. |
| 2017/0109752 | A1 | 4/2017 | Hubbard et al. |
| 2017/0154332 | A1 | 6/2017 | Vora et al. |
| 2017/0193511 | A1 | 7/2017 | Dominguez et al. |
| 2017/0272253 | A1 | 9/2017 | Lavender et al. |
| 2017/0286700 | A1* | 10/2017 | Sartor ................. H04L 63/0823 |
| 2017/0300960 | A1 | 10/2017 | Khvostov et al. |
| 2017/0324719 | A1* | 11/2017 | Mason ................. H04L 63/108 |
| 2017/0352026 | A1* | 12/2017 | Musil .................. G06Q 20/382 |
| 2018/0240170 | A1 | 8/2018 | Dominguez et al. |
| 2020/0294045 | A1* | 9/2020 | Howard ............. G06Q 30/0617 |
| 2020/0394656 | A9 | 12/2020 | Seshadri et al. |
| 2021/0374743 | A1 | 12/2021 | Kohli |

FOREIGN PATENT DOCUMENTS

| | | |
|---|---|---|
| CN | 105684010 A | 6/2016 |
| CN | 106936642 A | 7/2017 |

OTHER PUBLICATIONS

S. K. Doddavula and V. Saxena, "Implementation of a Secure Genome Sequence Search Platform on Public Cloud: Leveraging Open Source Solutions," 2011 IEEE Third International Conference on Cloud Computing Technology and Science, Athens, Greece, 2011, pp. 205-212. (Year: 2011).*

Office Action in related Application No. CN201980028414.6, Mailed on Aug. 10, 2022.

Application No. EP19792674.4, Extended European Search Report, Mailed on May 10, 2021.

Application No. PCT/US2019/028880, International Search Report and Written Opinion, Mailed on Sep. 27, 2019.

Application No. SG11202010334X, Written Opinion, Mailed on Jul. 29, 2022.

Application No. EP24178639.1, Extended European Search Report, Mailed on Oct. 7, 2024, 6 pages.

* cited by examiner

EFFICIENT AND SECURE AUTHENTICATION SYSTEM

CROSS-REFERENCE TO RELATED APPLICATIONS

This application is a continuation of U.S. application Ser. No. 17/049,225, filed Oct. 20, 2020, which is a 371 National Stage of International Application No. PCT/US2019/028880 filed Apr. 24, 2019, which claims the benefit of the filing dates of U.S. Provisional Application Nos. 62/662,134, 62/662,648, and 62/728,303, filed Apr. 24, 2018, Apr. 25, 2018, and Sep. 7, 2018. The disclosures of above-named applications are incorporated by reference herein in their entireties.

BACKGROUND

Strong authentication of users can be a significant component of protecting sensitive user data and maintaining security during interactions. Strong authentication can require additional authentication steps such as multi-factor authentication, additional passwords, biometric input, etc. This can reassure users that their sensitive data is protected and that the interaction they are conducting is secure. Strong authentication can be implemented, for example, in payment transactions and for secure database access. During payment transactions in particular, authentication systems like 3D Secure can provide a high level of security. One problem is that the strong authentication can be too strong at times. Requiring too many authentication steps, or making a process too difficult for even legitimate users, can have a negative effect on services or resource providers that use strong authentication. In some cases, users and/or resource providers may opt for less secure authentication methods, putting sensitive data at risk. Additional and needless authentication can also create a large number of authentication messages, which can unnecessarily consume excess computational resources.

Embodiments of the invention address these and other problems individually and collectively.

BRIEF SUMMARY

One embodiment of the invention includes receiving, by a directory server computer, an indication from a user that a resource provider is trusted, wherein the directory server computer is programmed to provide a first level of authentication and storing, by the directory server computer in a database, data representing the indication from the user that the resource provider is trusted. The method then includes receiving, by the directory server computer, an authentication request message from the user conducting an interaction at the resource provider computer and determining, by the directory server computer, that the data representing the indication from the user that the resource provider is trusted is present. In response to determining, the method includes providing, by the directory server computer, a second level of authentication to the user before the user is allowed to complete the interaction, wherein the second level of authentication is lower than the first level of authentication.

Another embodiment of the invention includes a directory server computer including a processor; and a computer-readable medium, coupled to the processor, the computer-readable medium including code, executable by the processor to implement a method that includes receiving an indication from a user that a resource provider is trusted, wherein the directory server computer is programmed to provide a first level of authentication, and storing, in a database, data representing the indication from the user that the resource provider is trusted. The method then includes receiving an authentication request message from the user conducting an interaction at the resource provider computer and determining that the data representing the indication from the user that the resource provider is trusted is present. In response to determining, the method includes providing a second level of authentication to the user before the user is allowed to complete the interaction, wherein the second level of authentication is lower than the first level of authentication.

Another embodiment of the invention includes a system including a directory server computer including a first processor and a first computer-readable medium, the first computer-readable medium including code, executable by the first processor to implement a method that includes sending, to a resource provider computer, a trusted marker. The system also includes a processing computer including a second processor and a second computer-readable medium, the second computer-readable medium including code, executable by the second processor to implement a method that includes receiving an authorization request message for an interaction, the authorization request message including the trusted marker. The method then includes validating the trusted marker and sending the authorization request message including the trusted marker to an authorizing entity computer.

Another embodiment of the invention includes receiving, by a processing computer, an authorization request message for an interaction between a user and a resource provider, the authorization request message including a trusted marker. The method then includes validating, by the processing computer, the trusted marker and sending, by the processing computer, the authorization request message including the trusted marker to an authorizing entity computer.

Another embodiment of the invention includes requesting, by a resource provider computer, trusted listing status from a user and sending, by the resource provider computer, a trusted listing request message to a directory server computer. The method then includes receiving, by the resource provider computer from the directory server computer, a trusted listing response message, the trusted listing response message indicating that the user was authenticated at a first level of authentication and including a trusted marker. Then the method includes sending, by the resource provider computer, an authentication request message for an interaction to the directory server computer, the authentication request message including the trusted marker and receiving, by the resource provider computer from the directory server computer, an authentication response message indicating that the user was authenticated at a second level of authentication, wherein the second level of authentication is lower than the first level of authentication.

Another embodiment of the invention includes a resource provider computer including a processor; and a computer-readable medium, coupled to the processor, the computer-readable medium including code, executable by the processor to implement a method that includes requesting trusted listing status from a user and sending a trusted listing request message to a directory server computer. The method then includes receiving, from the directory server computer, a trusted listing response message, the trusted listing response message indicating that the user was authenticated at a first level of authentication and including a trusted marker. Then the method includes sending an authentication request message for an interaction to the directory server computer, the authentication request message including the trusted marker and receiving, from the directory server computer, an authentication response message indicating that the user was authenticated at a second level of authentication, wherein the second level of authentication is lower than the first level of authentication.

Further details regarding embodiments of the invention can be found in the Detailed Description and the Figures.

DETAILED DESCRIPTION

Figure 1:
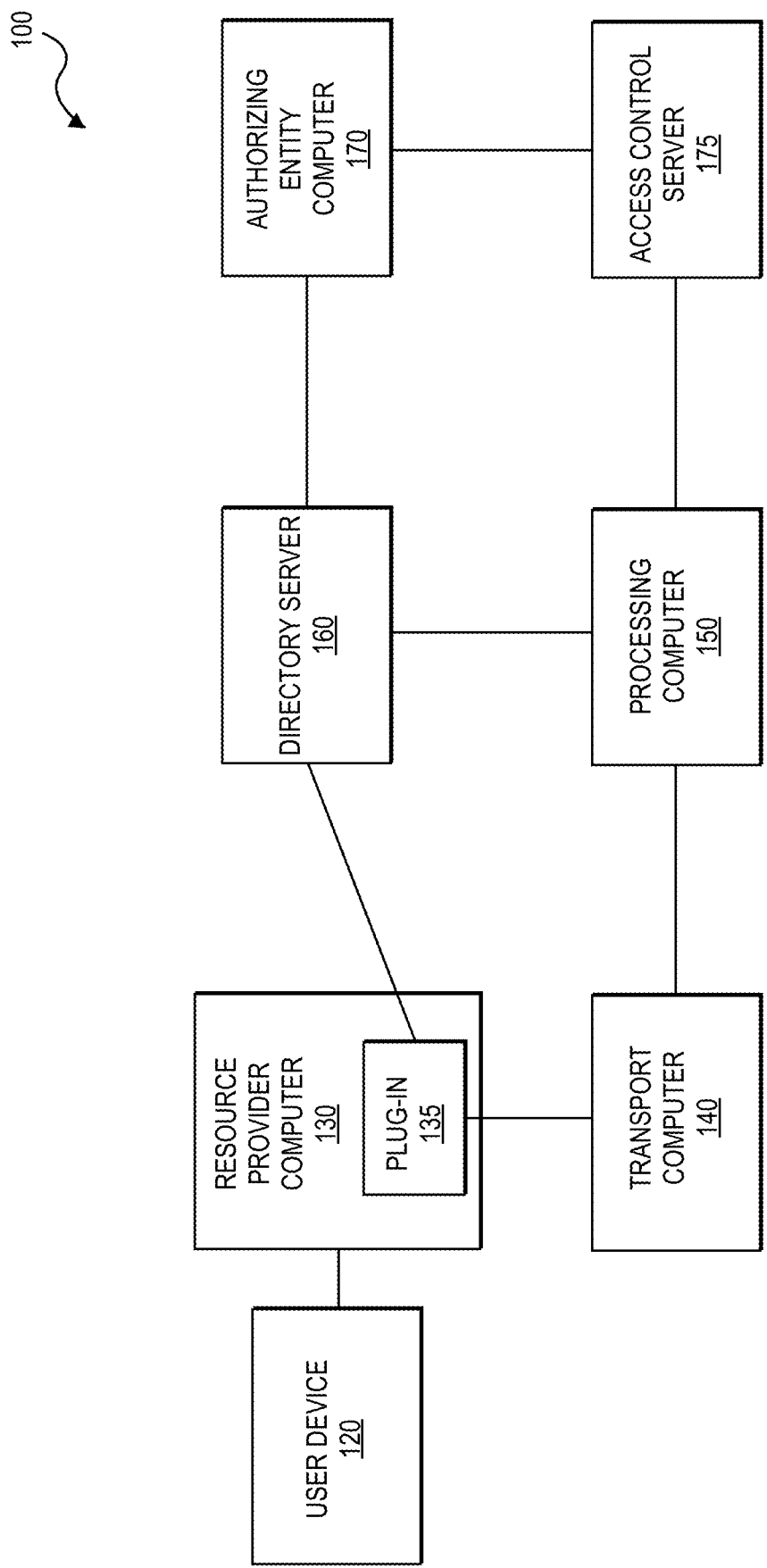
FIG. 1 shows a block diagram of a system according to embodiments.

Embodiments of the invention can reduce the time and resources spent on authentication. In particular, in embodiments of the invention, users can indicate that they trust a resource provider and mark the resource provider as a trusted listing, thereby avoiding strong authentication for subsequent interactions with that resource provider. Resource providers may need to provide proof that the user has requested the trusted listing. Authenticating entities (e.g., access control servers, issuers) may have the ability to manage the trusted listing (e.g. remove the resource provider as a trusted listing for the user). In embodiments, the resource provider can request additional authentication using an existing strong authentication process.

Although multiple implementation options exist, embodiments may include one or more components. The components may include strong authentication when a trusted listing is created (e.g., the user is authenticated via biometric or one-time password), the ability for authenticating entities to remove a trusted listing, and proof that the trusted listing is still active/valid (e.g., an indicator or flag that the trusted listing has been validated).

Embodiments invention may provide exemplary systems, devices, and methods for conducting transactions and related activities. Although reference may be made to such transactions in the examples provided below, embodiments are not so limited.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "resource provider" may be an entity that may make resources available to a user. Examples of resource providers include merchants, vendors, suppliers, owners, traders, and the like. In some embodiments, such entities may be a single individual, small groups of individuals, or larger groups of individuals (e.g., companies). Resource providers may be associated with one or more physical locations (e.g., supermarkets, malls, stores, etc.) and online platforms (e.g., mobile applications, e-commerce websites, online companies, etc.). In some embodiments, resource providers may make available physical items (e.g., goods, products, etc.) to the user. In other embodiments, resource providers may make available digital resources (e.g., electronic documents, electronic files, etc.) to the user. In other embodiments, resource providers may manage access to certain resources (e.g., password, code, etc.) by the user.

A "resource provider computer" may include any system associated with a resource provider. In some embodiments, the resource provider computer may handle functionality of a mobile application and/or a website associated with the resource provider from which a user may conduct an online transaction. The resource provider computer may also be known as the resource provider computing device.

An "acquirer" may be a business entity (e.g., a commercial bank) that has a business relationship with a particular resource provider or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may be a business entity (e.g., a bank) that maintains an account for a user. An issuer may also issue payment credentials stored on a user device, such as a cellular telephone, smart card, tablet, or laptop to the user.

A "payment processing network" may be data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

An "authentication request message" may be an electronic message that is sent to one or more computing devices to request authentication for an interaction. In some embodiments, the authentication request message may be an electronic message that is sent to a payment processing network and/or an issuer of an account to request authentication for a transaction. In some implementations, the authentication request message may include user, resource provider, and transaction-specific information. The authentication request message according to some embodiments may comply with HTTP standards, which may be defined according to the HTTP messaging specification, and may be an HTTP "GET" or "POST" message.

An "authentication response message" may be an electronic message reply to an authentication request. In some embodiments, the authentication response message may be generated by an issuer or a payment processing network. In some implementations, the authentication response message may include user, resource provider, and transaction-specific information. An authentication response message according to some embodiments may comply with ISO 8583, which is a standard for systems that exchange electronic transaction information associated with a payment made by a user using a payment device or a payment account.

An "authorization request message" may be a message that is sent to request authorization for an interaction. An authorization request message may be sent, for example to a secure data server, a payment processing network, an issuer of a payment card, a processing gateway, etc. An authorization request message may also include additional data elements corresponding to "identification information" including, for example, a service code, a user identifier, a CVV (card verification value), an expiration date, etc. An authorization request message may also include "interaction data," such as any information associated with a current interaction, such as an interaction value, a time stamp, resource provider identifier, resource provider location, etc., as well as any other information that may be utilized in determining whether to authorize an interaction. An authorization request message according to some embodiments may comply with ISO 8583, which is a standard for systems that exchange electronic transaction information associated with a payment made by a user using a payment device or payment account.

An "authorization response message" may be a message reply to an authorization request message. The authorization response message may be generated, for example, by a secure data server, an issuing financial institution, a payment processing network, a processing gateway, etc. The authorization response message may include, for example, one or more of the following status indicators: Approval—interaction was approved; Decline—interaction was not approved; or Call Center—response pending more information, resource provider must call the toll-free authorization phone number. The authorization response message may also include an authorization code, which may be a code that an authorizing entity returns in response to an authorization request message in an electronic message to the resource provider's access device that indicates approval of the transaction. The code may serve as proof of authorization.

A "server computer" may be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

A "user device" may be any suitable electronic device that can process and communicate information to other electronic devices. The user device may include a processor and a computer-readable medium coupled to the processor, the computer-readable medium including code, executable by the processor. The user device may also each include an external communication interface for communicating with each other and other entities. Examples of user devices may include a mobile device, a laptop or desktop computer, a wearable device, etc.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), username, expiration date, and verification values such as CVV, dCVV, CVV2, dCVV2, and CVC3 values.

A "stored credential transaction" may be a transaction where a resource provider uses payment credentials from a user that have been previously stored. A stored credential transaction may also be called a credential-on-file or card-on-file transaction. A stored credential transaction may be used, for example, for installment payments or for the convenience of the resource provider or user.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the payment token format may be configured to allow the entity receiving the payment token to identify it as a payment token and recognize the entity that issued the payment token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token).

A "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing token services.

A "plug-in" (or "PI") may be a computer component that performs specific functions on behalf of an entity. For example, a plug-in may perform various authentication functions. The plug-in may be used by a resource provider. The plug-in may be embodied by suitable hardware and/or software that are accessible to a resource provider. For example, the plug-in may be software running on a resource provider computing device or it may be a component run on a different server accessible by the resource provider. The plug-in may be able to perform functions such as determining whether authentication is available for an account identifier, validating a digital signature in an authentication message, and other functions.

An "access control server" (or "ACS") may provide authorizing entities with the ability to authenticate users during an online transaction. An ACS performs the requested authentication services and provides digitally signed responses to entities requesting authentication. An ACS may be shared by multiple entities. Additionally, or alternatively, an entity may have multiple access control servers, each associated with a different subset of users.

A "directory server" can be used to route messages containing enrollment and authentication information between a plug-in (PI) and an ACS. The directory server can also determine whether a user can utilize the authentication services. In some embodiments, the directory server can be operated by a service organization such as Visa. The directory server may include a directory server computer.

An entity may be "trusted" if they are regarded as reliable or honest. The entity may build trust over time. Trust may be built, for example, with repeated successful interactions, successful authentication, etc. An entity may also be trusted because of association with another trusted entity, such as a government entity.

A "trusted listing" may be an entity that is trusted by another entity. For example, a user may indicate that a resource provider is a trusted listing if the user is familiar with the resource provider and has conducted many transactions with them without problems. An entity that is a trusted listing may be referred to as having trusted listing status and/or being trusted. In some embodiments, a trusted listing may be referred to as being on a whitelist and/or as being whitelisted.

A "trusted marker" may be an indicator that an entity is a trusted listing. Trusted markers may be used, for example, in an authorization request message to indicate that the entity sending the authentication request message is trusted by the entity being authenticated.

A "level of authentication" may relate a particular authentication strength. Different authentication levels can have different protocols and different levels of assurance or strength. For example, a first level of authentication may be provided by an entity such as a directory server, an access control server, etc. The first level of authentication may be a relatively high level of authentication, and may or may not be the highest level of authentication offered by the authenticating entity. The first level of authentication may be strong authentication. Examples of a first level of authentication may include two-factor or multi-factor authentication, biometric authentication, a password, and a cryptogram. In another example, a second level of authentication may be lower than a first level of authentication. The second level of authentication may be provided by an entity such as a directory server, an access control server, etc. In some embodiments, the second level of authentication may be no authentication. Other examples of a second level of authentication may include a PIN and retrieving data from a device.

One embodiment of the invention is directed to a method. The method includes receiving, by a directory server computer, an indication from a user that a resource provider is trusted. The indication may state that a user confirms that the resource provider is a trusted listing. Trust may be developed in a number of ways. For example, trust can be developed between the user and the resource provider because the user has conducted a large number of transactions with the resource provider without problems.

The directory server computer can be programmed to provide (e.g., execute or initiate) a first level of authentication. For example, the directory server computer may be programmed to initiate an authentication process with an access control server (ACS), and the ACS may ask the user for a password. The ACS may return a cryptogram or other indicator to the directory server computer to confirm that the ACS authenticated the user. In other embodiments, the directory server computer may directly ask the user for a password. Data representing the indication that the resource provider is trusted by the user may be stored in a database. The directory server computer may then send a trusted marker to the resource provider. The trusted marker may allow the resource provider to indicate in a subsequent authentication request message or authorization request message that they are trusted by the user At a later point in time, the directory server computer may receive an authentication request message from the user conducting an interaction at the resource provider computer. The authentication request message may include the trusted marker. The directory server computer determines that the data representing the indication from the user that the resource provider is trusted is present. In response to determining, the directory server computer can apply a second level of authentication to the user before the user is allowed to complete the interaction. The second level can be lower or less stringent than the first level. For example, if the first level of authentication requires a password, then the second level of authentication may not require a password or may use device data collected from the user's user device, without asking the user for a password.

FIG. 1 shows a system 100 including a number of components according to embodiments of the invention. The system 100 may include a user device 120, a resource provider computer 130 with a plug-in 135, a transport computer 140, a processing computer 150, a directory server computer 160, and an authorizing entity computer 170 with an access control server (ACS) 175.

The user device 120, the resource provider computer 130, the transport computer 140, the processing computer 150, the directory server computer 160, the ACS 175, and the authorizing entity computer 170 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP), Hypertext Transfer Protocol (HTTP), Secure Hypertext Transfer Protocol (HTTPS), Secure Socket Layer (SSL), ISO (e.g., ISO 8583) and/or the like.

The user device 120 may allow a user to conduct interactions with resource providers. The user device 120 may be, for example, a mobile device such as a smartphone or smartwatch, or a laptop computer. In some embodiments, the user device 120 may include an issuer application such as a mobile wallet application or payment application for conducting payment transactions. In other embodiments, the user device 120 may include an access application that may be provisioned with access data to enable the user device 120 to conduct access transactions. The user device 120 may also store a user identifier and/or an account identifier. Examples of user identifiers may include an alphanumeric string, a phone number, a cryptogram, etc. Account identifiers may include an account number, a PAN, a token, payment credentials, access credentials, etc.

The resource provider computer 130 may be operated by a resource provider. The resource provider may be, for example, a merchant selling material goods or a secure data server providing access to protected data. The resource provider computer 130 may interact with the user device 120. The resource provider computer 130 may also have a plug-in 135. The plug-in 135 may allow the resource provider computer 130 to communicate with the directory server computer 160 and the ACS 175.

The resource provider may have a resource provider identifier, and the resource provider identifier may be stored on the resource provider computer 130. In some embodiments, the resource provider identifier may be numeric, alphanumeric, binary, or hexadecimal. For example, the resource provider identifier may be an 8 digit number. The resource provider identifier may be assigned by the processing computer 150 (e.g., a computer in a payment processing network) or the directory server computer 160. The resource provider identifier may not be dependent on an acquirer of the resource provider. This may prevent complications if the resource provider has a relationship with more than one acquirer. This may also allow a resource provider to maintain their trusted listing status with users even if the resource provider changes acquirers.

Some resource providers may control multiple brands. For example, a resource provider may have a brand that sells furniture and another brand that sells electronics. The different brands may or may not be marketed differently to the user. In some embodiments, both brands of the resource provider may receive the same resource provider identifier. Therefore, multiple brands of a resource provider, which users may or may not know are related, may receive trusted listing status together. In other embodiments, each brand may receive a distinct resource provider identifier. In this way each brand may have distinct trusted listing statuses.

The transport computer 140 may be operated by an acquirer of the resource provider. The transport computer 140 may receive authorization request messages from the resource provider computer 130 and send them to the processing computer 150. The transport computer 140 may also communicate authorization response messages from the processing computer 150 to the resource provider computer 130.

The processing computer 150 may be part of a payment processing network. The processing computer 150 may take part in authorization processes and may route authorization messages. In some embodiments, the processing computer 150 may perform tokenization and de-tokenization processes. The processing computer 150 may maintain a trusted listing database of resource providers trusted by users.

In some embodiments, the directory server computer 160 may be part of a payment processing network. The directory server computer 160 may take part in authentication processes and may route authentication messages. The directory server computer 160 may maintain a directory specifying the location and capabilities of entities such as ACSs in system 100. The capabilities of ACSs may include whether an ACS supports authentication with strong authentication and/or trusted listings. In some embodiments, the directory server computer 160 may be a strong authentication service provider, such as a 3D Secure (3DS) program server.

The authorizing entity computer 170 may authorize transactions between the user and resource provider. The authorizing entity computer 170 may be in communication with an ACS 175. The authorizing entity computer 170 may be operated by an issuer of the user.

The access control server (ACS) 175 may be a computer or may be part of the authorizing entity computer 170. In some embodiments, both authorizing entity computer 170 and ACS 175 may be operated by the same entity (e.g., an issuer), but they can be separate computers. The ACS 175 may allow the authorizing entity computer 170 to also authenticate users. ACS 175 may contain account information, such as account identifiers and passwords for each user account.

Figure 2:
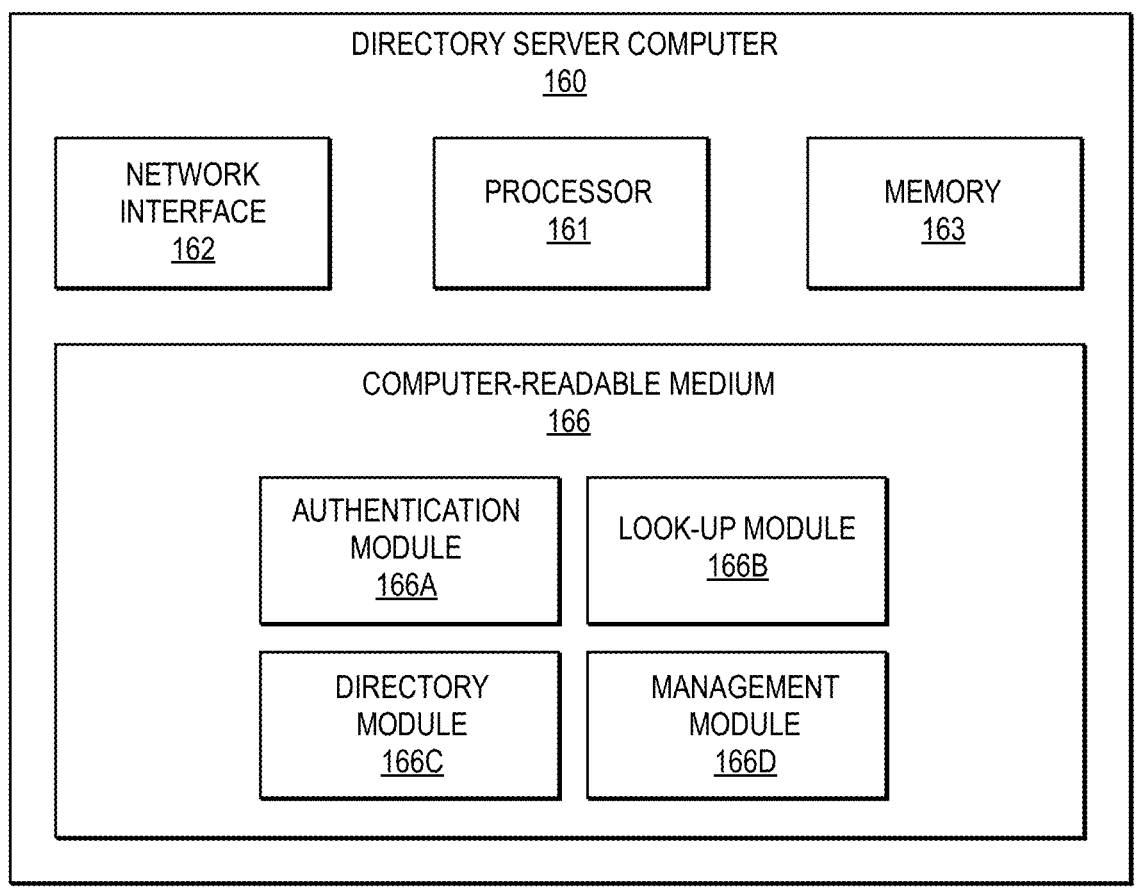
FIG. 2 shows a block diagram of a directory server computer according to embodiments.

FIG. 2 shows a block diagram of a directory server computer 160 according to embodiments of the invention. Directory server computer 160 may include a processor 161 coupled to a network interface 162, a memory 163, and a computer-readable medium 166. Computer-readable medium 166 may store code executable by the processor 161 for implementing some or all of the functions of directory server computer 160 described herein. For example, computer-readable medium 166 may include an authentication module 166A, a look-up module 166B, a directory module 166C, and a management module 166D.

Processor 161 may be implemented as one or more integrated circuits (e.g., one or more single core or multicore microprocessors and/or microcontrollers). The processor 161 may be used to control the operation of the directory server computer 160. The processor 161 can execute a variety of programs in response to program code or computer-readable code stored in memory 163. The processor 161 may include functionality to maintain multiple concurrently executing programs or processes.

Network interface 162 may be configured to connect to one or more communication networks to allow directory server computer 160 to communicate with other entities such as a transport computer 140, an authorizing entity computer 170, a processing computer 150, etc. For example, communication with the authorizing entity computer 170 can be direct, indirect, and/or via an API.

Memory 163 may be implemented using any combination of any number of non-volatile memories (e.g., flash memory) and volatile memories (e.g., DRAM, SRAM), or any other non-transitory storage medium, or a combination of media.

Computer-readable medium 166 may include one or more non-transitory media for storage and/or transmission. Suitable media include, as examples, a random access memory (RAM), a read only memory (ROM), a magnetic medium such as a hard-drive, or an optical medium such as a compact disk (CD) or DVD (digital versatile disk), flash memory, and the like. The computer-readable medium 166 may be any combination of such storage or transmission devices.

Authentication module 166A, in conjunction with the processor 161, may take part in authentication processes. The authentication module 166A, in conjunction with the processor 161, may receive an authentication request message. The authentication module 166A, in conjunction with the processor 161, may then send the authentication request message to an ACS for authentication. In other embodiments, the authentication module 166A, in conjunction with the processor 161, may authenticate the user directly. The authentication module 166A, in conjunction with the processor 161, may determine what level of authentication should be applied to a user. For example, the authentication module 166A, in conjunction with the processor 161, may determine that a lower level of authentication is appropriate because the user is interacting with a trusted listing.

Look-up module 166B, in conjunction with the processor 161, may query a trusted listing database of the processing computer 150. By querying the trusted listing database, the look-up module 166B, in conjunction with the processor 161, may be able to determine if data indicating that a resource provider is trusted is present. Such data may include, for example, a flag, a date that the trusted listing was established, a trusted marker, or some other data field. The look-up module 166B, in conjunction with the processor 161, may use a user identifier or an account identifier to query the trusted listing database. In some embodiments, the query may be sent to the processing computer 150 and the processing computer 150 may query the trusted listing database. The look-up module 166B may then receive an indication that a resource provider is trusted by the user.

Directory module 166C, in conjunction with the processor 161, may determine the authentication services that are available to a user. For example, the directory module 166C may determine that a user needs to enroll before using an authentication service. The directory module 166C, in conjunction with the processor 161, may also determine the authentication services supported by a particular ACS. For example, the directory module 166C, in conjunction with the processor 161, may determine whether or not an authorizing entity supports trusted listings. In some embodiments, the directory module 166C may maintain a directory of authentication services available to different authorizing entities and users. In other embodiments, the directory module 166C, in conjunction with the processor 161, may query entities to determine authentication services that are available.

Management module 166D, in conjunction with the processor 161, can manage trusted listings. The management module 166D, in conjunction with the processor 161, may change or remove trusted listing status for resource providers. The management module 166D may receive instructions to update or remove a trusted listing from the trusted listing database from a user or ACS (e.g., from an issuer). Additionally, or alternatively, the management module 166D, in conjunction with the processor 161, may periodically remove trusted listing status for resource providers to force reauthentication of users. If a user receives a new user identifier or new account information, the management module 166D, in conjunction with the processor 161, may transfer the trusted listing associated with the prior user identifier to the new user identifier. In some embodiments, the management module 166D, in conjunction with the processor 161, may send instructions to the processing computer 150 with the desired change.

Figure 3:
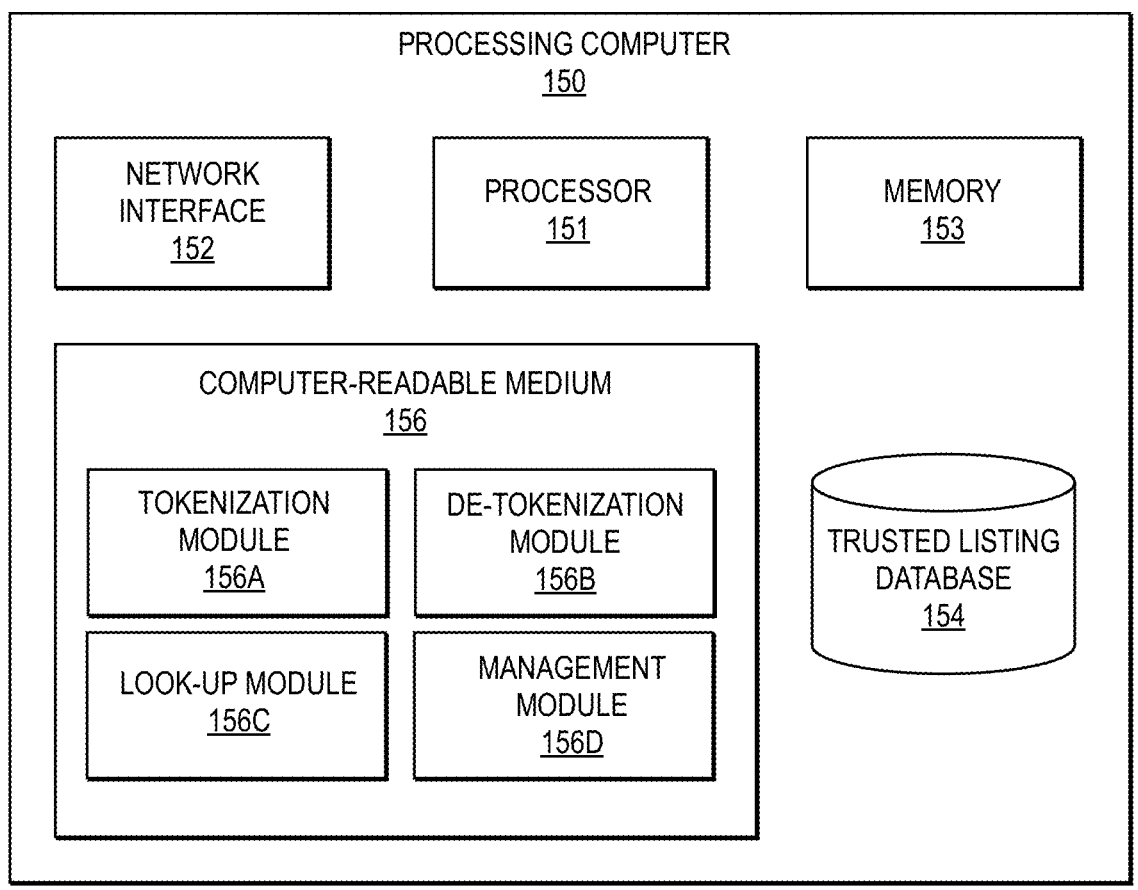
FIG. 3 shows a block diagram of a processing computer according to embodiments.

FIG. 3 shows a block diagram of a processing computer 150 according to embodiments of the invention. Processing computer 150 may include a processor 151 coupled to a network interface 152, a memory 153, and a computer-readable medium 156. Computer-readable medium 156 may store code executable by the processor 151 for implementing some or all of the functions of processing computer 150 described herein. For example, computer-readable medium 156 may include a tokenization module 156A, a de-tokenization module 156B, a look-up module 156C, and a management module 156D. The processing computer 150 may also include a trusted listing database 154.

Processor 151 may be implemented as one or more integrated circuits (e.g., one or more single core or multicore microprocessors and/or microcontrollers). The processor 151 may be used to control the operation of the processing computer 150. The processor 151 can execute a variety of programs in response to program code or computer-readable code stored in memory 153. The processor 151 may include functionality to maintain multiple concurrently executing programs or processes.

Network interface 152 may be configured to connect to one or more communication networks to allow processing computer 150 to communicate with other entities such as a transport computer 140, an authorizing entity computer 170, a directory server computer 160, etc. For example, communication with the authorizing entity computer 170 can be direct, indirect, and/or via an API.

Memory 153 may be implemented using any combination of any number of non-volatile memories (e.g., flash memory) and volatile memories (e.g., DRAM, SRAM), or any other non-transitory storage medium, or a combination of media.

Computer-readable medium 156 may include one or more non-transitory media for storage and/or transmission. Suitable media include, as examples, a random access memory (RAM), a read only memory (ROM), a magnetic medium such as a hard-drive, or an optical medium such as a compact disk (CD) or DVD (digital versatile disk), flash memory, and the like. The computer-readable medium 156 may be any combination of such storage or transmission devices.

Tokenization module 156A, in conjunction with the processor 151, may generate tokens for account information, such as credentials. The tokenization module 156A, in conjunction with the processor 151, may generate tokens in response to a token request message from a resource provider. Some tokens may be payment tokens based on payment credentials. If the resource provider is a trusted listing, the token may be a trusted listing token and may include a trusted marker to indicate to other entities (e.g., an authorizing entity) that the resource provider is trusted.

De-tokenization module 156B, in conjunction with the processor 151, may map tokens to the account information associated with the token. For example, the de-tokenization module 156B, in conjunction with the processor 151, may map a token from a user to a PAN of the user.

Look-up module 156C, in conjunction with the processor 151, may query the trusted listing database 154. By querying the trusted listing database, the look-up module 156C, in conjunction with the processor 151, may be able to determine if data indicating that a resource provider is trusted is present. The look-up module 156C, in conjunction with the processor 151, may use a user identifier or an account identifier to query the trusted listing database 154. The look-up module 156C may then receive from the trusted listing database 154 data indicating that a resource provider is trusted by the user. Such data may include, for example, a flag, a date that the trusted listing was established, a trusted marker, or some other data field.

Management module 156D, in conjunction with the processor 151, can manage trusted listings. The management module 156D, in conjunction with the processor 151, may change or remove trusted listing status for resource providers. The management module 156D may receive instructions to update or remove a trusted listing from the trusted listing database 154 from a user or ACS (e.g., from an issuer). Additionally, or alternatively, the management module 156D, in conjunction with the processor 151, may periodically remove trusted listing status for resource providers to force reauthentication of users. If a user receives a new user identifier or account identifier, the management module 156D, in conjunction with the processor 151, may transfer the trusted listings associated with the previous identifier to the new identifier.

Trusted listing database 154 may store trusted listing information for users and resource providers. Trusted listing database 154 may store resource provider identifiers for resource providers that are trusted by users, and user identifiers of the users that trust each resource provider. The trusted listing database 154 may additionally, or alternatively, store account identifiers for users. The trusted listing database 154 may also store data that indicates that resource providers are trusted (e.g., trusted markers, trusted listing tokens, cryptograms). The trusted listing database 154 can also store when trusted listing status was established and when trusted listing status is removed. For example, the date that trusted listing was created can be used to reauthenticate trusted listings in the trusted listing database after one year. In some embodiments, the trusted listing database 154 may be shared between the processing computer 150 and the directory server computer 160, or may be associated with the directory server computer 160.

Figure 4:
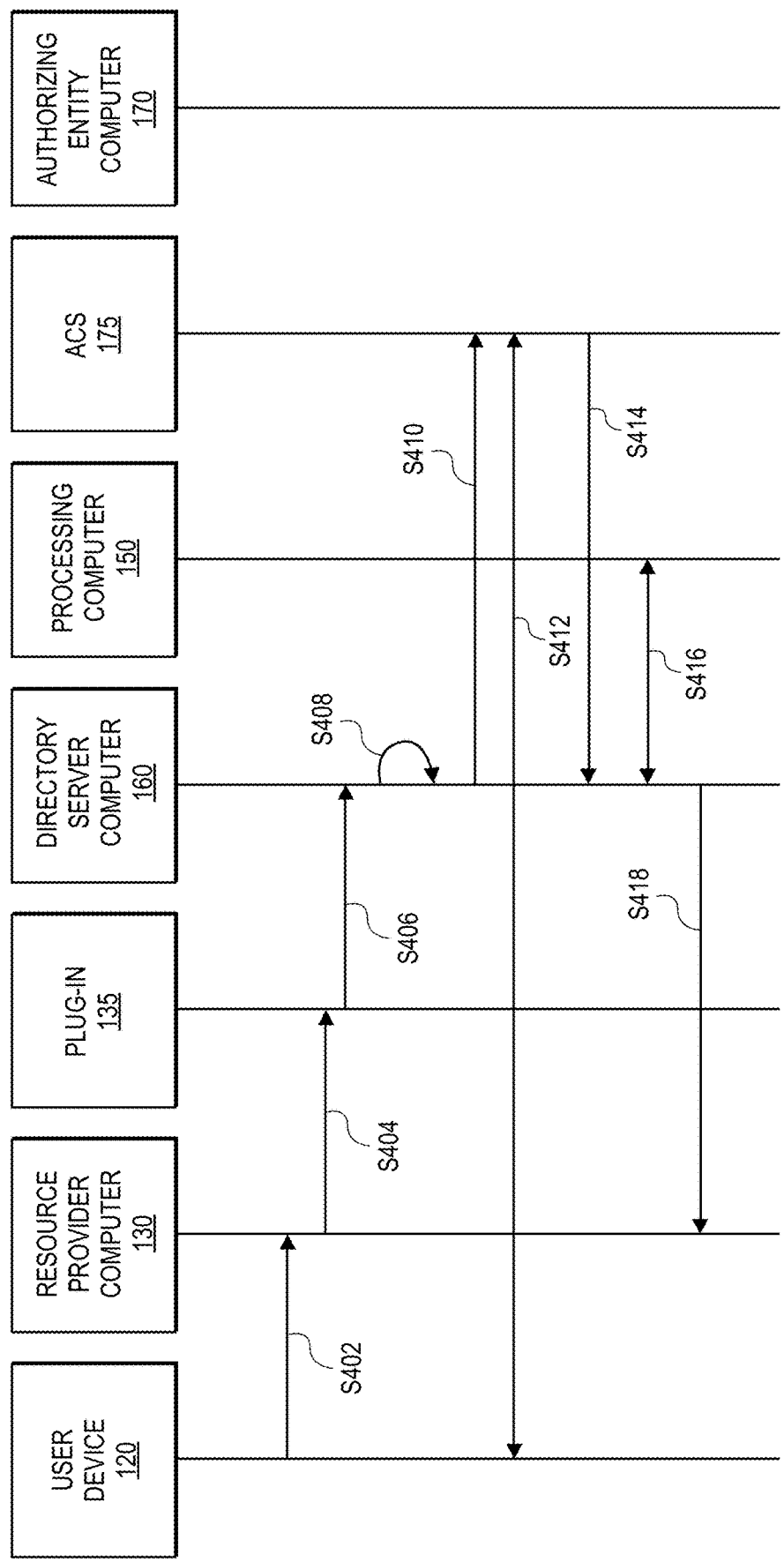
FIG. 4 shows a swim lane diagram of enrollment according to embodiments.

FIG. 4 shows a swim-lane diagram of enrolling a resource provider as a trusted listing for a user according to embodiments. In some embodiments, enrollment may occur during a transaction. In other embodiments, enrollment may occur as an interaction separate from a transaction.

In step S402, a user can initiate enrollment with a resource provider using a user device 120. In some embodiments the enrollment may be part of, for example, 3DS enrollment or secure remote commerce (SRC) enrollment processes. The user device 120 may send an account identifier (e.g., a PAN, token, credentials) to the resource provider computer 130. The user device 120 may additionally, or alternatively, send a user identifier (e.g., a code, a phone number) that can be mapped to the account identifier. In some embodiments, the resource provider computer 130 may request trusted listing status from the user during a transaction. For example, the resource provider computer 130 may request trusted listing status by sending a message to the user device 120 during a transaction. The user device 120 can display a message such as "do you want to consider Joe's Clothes a trusted merchant for future transactions?" The user may choose to accept the trusted listing request or not. If the user chooses not to accept the trusted listing request, the enrollment process may end. If the user accepts the trusted listing request, the enrollment process may continue. Prior to requesting trusted listing status, the resource provider computer 130 may verify that the user is able to have a trusted listing. A plug-in 135 of the resource provider computer 130 may be invoked and the plug-in 135 may determine that the user is able to have a trusted listing. For example, the transaction messages may include an authorizing entity eligibility flag to indicate if/when the resource provider computer 130 can request user enrollment, based on the authorizing entity of the user. In some embodiments, the user may agree to additionally store credentials (e.g., payment credentials) with the resource provider computer 130.

In some embodiments, the resource provider computer 130 may obtain a token (e.g., a payment token) of the user during the interaction. The resource provider computer 130 may obtain the token through a standard process. For example, the user may send a token from the user device 120 to the resource provider computer 130. Alternatively the resource provider computer 130 may request the token from a token service system.

In step S404, the resource provider computer 130 can invoke the plug-in 135 to generate a trusted listing request flag. The trusted listing request flag may indicate that the resource provider is trusted by the user and that the resource provider computer 130 is requesting trusted listing status. In some embodiments, the resource provider computer 130 may initiate an authentication process and receive CAVV (card authentication verification value) data that can then be passed to the plug-in 135.

In step S406, the plug-in 135 can generate a trusted listing request message. The trusted listing request message may include the trusted listing request flag, a resource provider identifier, the account identifier and/or the user identifier. The plug-in 135 may then send the trusted listing request message to a directory server computer 160.

In embodiments, the trusted listing request message may be part of other transaction messages. In some embodiments, the trusted listing request message may be a strong authentication request message (e.g., a 3D Secure message) including the trusted listing request flag. In other embodiments, the trusted listing request message can be part of a token request message. For example, the plug-in 135 can submit a token request message to the directory server computer 160 that includes the trusted listing request flag. The token request message may alternatively be sent to an authorizing entity computer 170 or a processing computer 150. In other embodiments, the trusted listing request message may be part of a stored credential transaction message. For example, the plug-in 135 may submit an establishment-of-credential transaction message requesting permission to store credentials of the user. The establishment-of-credential transaction message can include the trusted listing request flag in addition to an establishment of stored credential request flag (e.g., POS environment field as 'C'). The establishment-of-credential transaction message can be an account verification if the user is not being charged or a payment transaction if a charge is involved.

In embodiments, a transaction message can also include a CAVV (card authentication verification value), a TAVV (transaction authentication verification value), and an MVV (merchant verification value). A CAVV can be a cryptogram that establishes that the user has been authenticated for a transaction. A TAVV can be a cryptogram that accompanies a token that restricts the token to a specific domain. A MVV may be a value indicating that the resource provider is verified and/or participating in a particular program. For example, the MVV may be "05" indicating that the resource provider is able to become a trusted listing. The MVV may also depend on the type of the resource provider. For example, airlines and coffee shops may have different resource provider types and may therefore have a different MVV even if they are in the same program.

In step S408, the directory server computer 160 can receive the trusted listing request message. The directory server computer 160 can then determine if the resource provider is already trusted by the user by determining if there is already data indicating that the resource provider is trusted in a trusted listing database. The directory server computer 160 may use the resource provider identifier and account identifier (or user identifier) to query the trusted listing database. The directory server computer 160 may communicate with a processing computer 150 to query the trusted listing database. If the directory server computer 160 received a token from the resource provider computer, the directory server computer 160 can map the token of the user to an account identifier (e.g., a PAN). The authorizing entity computer 170 may then be able to use the account identifier to identify an account associated with the user. The directory server computer 160 may also communicate with the processing computer 150 to map the token to the account identifier.

In step S410, the directory server computer 160 can provide a first level of authentication for the user. The first level may be strong authentication of the user. In some embodiments, the directory server computer 160 may authenticate the user directly. In other embodiments, the directory server computer 160 can send the trusted listing request message to an ACS 175 and the ACS 175 may authenticate the user. The directory server computer 160 may send the trusted listing request message to the ACS 175 through an authorizing entity computer 170. The trusted listing request message may include the account identifier, the resource provider identifier, and the trusted listing request flag. In some embodiments, based on a CVM (cardholder verification method), the directory server computer 160 can include a CVM indicator in the trusted listing request message. For example, the resource provider may have first verified the user at the beginning of the interaction by requesting a PIN. The directory server computer 160 may then include a CVM indicator to indicate that a PIN was used.

In step S412, the ACS 175 can perform a first level of authentication of the user. The authorizing entity computer 170 can send the request for authentication to an ACS 175. The request for strong authentication may include the account identifier, resource provider identifier, trusted listing request flag, and status. The ACS 175 may then issue a challenge to the user through the user device 120. For example, the ACS 175 may send a request for a password, such as a one-time password, to the user device 120. The user may be able to indicate that they do not recognize the resource provider and/or trusted listing request and cancel the enrollment process. In some embodiments, the authorizing entity computer 170 can use an existing strong authentication process (e.g., 3D Secure) to authenticate the user. A trusted listing request flag in a strong authentication message can indicate that step-up authentication is required. In some embodiments, the authorizing entity computer 170 may approve or deny the trusted listing request prior to requesting authentication of the user. For example, the resource provider associated with the trusted listing request may have a history of submitting fraudulent trusted listing request messages.

In step S414, after authenticating the user, the authorizing entity computer 170 may send a trusted listing response message to the directory server computer 160. The trusted listing response message may include an indication that the user has been authenticated (e.g., a cryptogram, a CAVV) and a trusted marker. The trusted listing response message may also include a transaction status, an electronic commerce indicator (ECI), and a CAVV.

In step S416, the directory server computer 160 may communicate the trusted marker to the processing computer 150. The processing computer 150 may store data representing that the resource provider is trusted by the user in the trusted listing database. Such data may include, for example, a flag, a date that the trusted listing was established, the trusted marker, or some other data field. The processing computer 150 may store the account identifier and the resource provider identifier, and optionally the user identifier, in the trusted listing database. The processing computer 150 may also store the trusted marker in the trusted listing database, and/or the indication that the user was authenticated. In some embodiments, a trusted listing token can be generated with the trusted marker. A strong authentication service provider can then retrieve the trusted listing token.

In step S418, the directory server computer 160 can send the trusted listing response message to the resource provider computer 130. The trusted listing response message may indicate to the resource provider that the trusted listing was successfully created and that the user was authenticated at the first level of authenticated. In some embodiments, if the resource provider sent an establishment-of-credentials transaction message, the resource provider computer 130 may store the account identifier, such as account credentials, for an account of the user for future stored credential transactions. Additionally, the directory server computer 160 may return the trusted marker to an acquirer of the resource provider to indicate successful trusted listing creation. In some embodiments, the resource provider computer 130 can retrieve the trusted listing token. The trusted marker may also indicate to the acquirer successful establishment of a stored credential. The resource provider computer 130 may maintain a list of users that have trusted the resource provider.

In some embodiments, the indication from the user that the resource provider is trusted is received from an authorizing entity computer 170. For example, the user may initiate enrollment through an issuer website or mobile application associated with the authorizing entity. The user may provide an account identifier and/or a user identifier to the authorizing entity computer 170 and select a resource provider that they want to trust. In some embodiments, the authorizing entity computer 170 may map the user identifier to an account identifier. The authorizing entity computer 170 may then generate a trusted listing request message including the account identifier and a resource provider identifier. The user may have previously authenticated themselves to the authorizing entity computer 170, for example in order to access the issuer website, so the trusted listing request message may also include an indication that the user has been authenticated. If the directory server computer 160 receives the trusted listing request message from the authorizing entity computer 170, the directory server computer 160 may not request authentication of the user from the authorizing entity computer 170.

Figure 5:
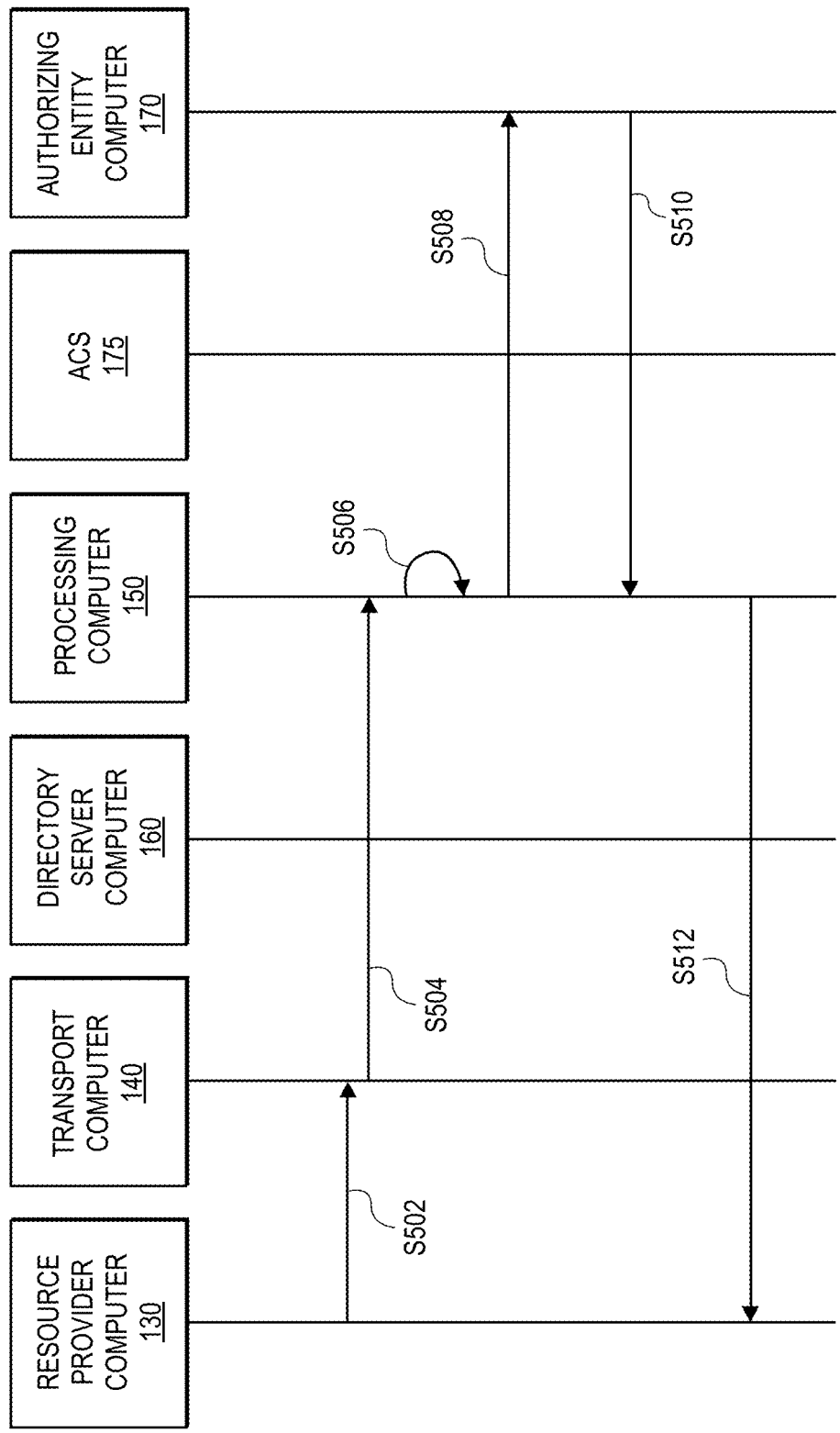
FIG. 5 shows a swim lane diagram of authorization according to embodiments.

FIG. 5 shows a swim lane diagram of subsequent authorization for a transaction with a trusted resource provider. The authorization process may occur directly after the enrollment process of FIG. 4, for example, if the enrollment process was part of a transaction.

In step S502, a resource provider computer 130 can send an authorization request message to a transport computer 140. The transport computer 140 may be operated by an acquirer of the resource provider. The authorization request message may include a trusted marker, a user identifier, a resource provider identifier, and transaction information (e.g., a transaction amount, a time stamp). The authorization request message may be sent by a plug-in of the resource provider computer 130. In some embodiments, the authorization request message may include a trusted listing token of the user and/or a cryptogram with the trusted marker. In some embodiments, the resource provider may submit a subsequent stored credential transaction message. The stored credential transaction message may include fields for TAVV and POS Entry Mode 10 (stored credential transaction). The authorization request message may additionally include an electronic commerce indicator (ECI), and a CAVV.

In step S504, the transport computer 140 can send the authorization request message to a processing computer 150. The processing computer 150 may be part of a payment processing network.

In step S506, the processing computer 150 can validate the trusted marker from the resource provider computer 130. The processing computer 150 may use the resource provider identifier and account identifier to query the trusted listing database and determine that data indicating that the resource provider is trusted is present. The processing computer 150 can use the data to validate the trusted marker to form a validated trusted marker. The processing computer 150 may add the validated trusted marker to the authorization request message. The processing computer 150 may additionally, or alternatively, add a flag to the authorization request message indicating that the trusted marker is valid. The flag and/or the validated trusted marker may have been added during a prior authentication process, such as the process of FIG. 4. The flag may depend on the MVV. For example, the resource provider may need to have a particular MVV indicating that the resource provider is able to be a trusted listing. Additionally, or alternatively, the flag may depend on the MVV having a value associated with a particular resource provider type. For example, trusted listing requirements for airlines may be different than that for coffee shops. Based on the CVM, the processing computer 150 may include a CVM indicator in the authorization request message. For example, the resource provider may have first verified the user at the beginning of the interaction by requesting a PIN. The processing computer 150 may then include a CVM indicator to indicate that a PIN was used. In some embodiments, for transactions using tokens, the processing computer 150 may check TAVV and user's trusted listing status with the token and resource provider identifier as part of token processing.

In step S508, the processing computer 150 can send the authorization request message to an authorizing entity computer 170. The authorization request message may include the flag indicating that the trusted marker is valid and/or the validated trusted marker, in addition to including transaction information (e.g., the transaction amount, the time stamp), the user identifier, and the resource provider identifier.

In step S510, the authorizing entity computer 170 may receive the authorization request message and process the transaction. The authorizing entity computer 170 can approve or deny the authorization request. The authorizing entity computer 170 may be more likely to approve authorization requests with a trusted marker, as it may indicate that the transaction is low-risk. Even though the resource provider is trusted by the user, the authorizing entity computer may still decline the authorization request, for example due to indicators of potential fraud. For example, the transaction can be for a higher than usual amount (e.g., $1000 instead of $20) or may originate from an unusual location (e.g., Russia instead of the United States). The authorizing entity computer 170 may then generate an authorization response message including an authorization decision (e.g., approved, denied). The authorizing entity computer 170 can then send the authorization response message to the processing computer 150.

In step S512, the processing computer 150 can send the authorization response message to the transport computer 140, and then the transport computer 140 may send the authorization response message to the resource provider computer 130. If the authorization is declined, the resource provider computer 130 may have the option to re-attempt the transaction. The resource provider may be advised to request additional user authentication, which may include strong authentication (e.g., as described with respect to FIG. 4).

In some embodiments, prior to transaction processing, the resource provider computer 130 may verify the status of the trusted listing via a cryptogram. The resource provider computer 130 may use the plug-in to request a cryptogram from the processing computer 150 during the transaction with the user. If the resource provider is trusted by the user, the resource provider computer 130 may receive the cryptogram with a trusted marker. If the resource provider is not trusted, then the resource provider computer 130 may be referred to a strong authentication process (e.g., as described with respect to FIG. 4). In other embodiments, the resource provider computer 130 may submit an account verification/file inquiry message to determine if the resource provider is trusted by the user prior to submitting a stored credential transaction message.

Figure 6:
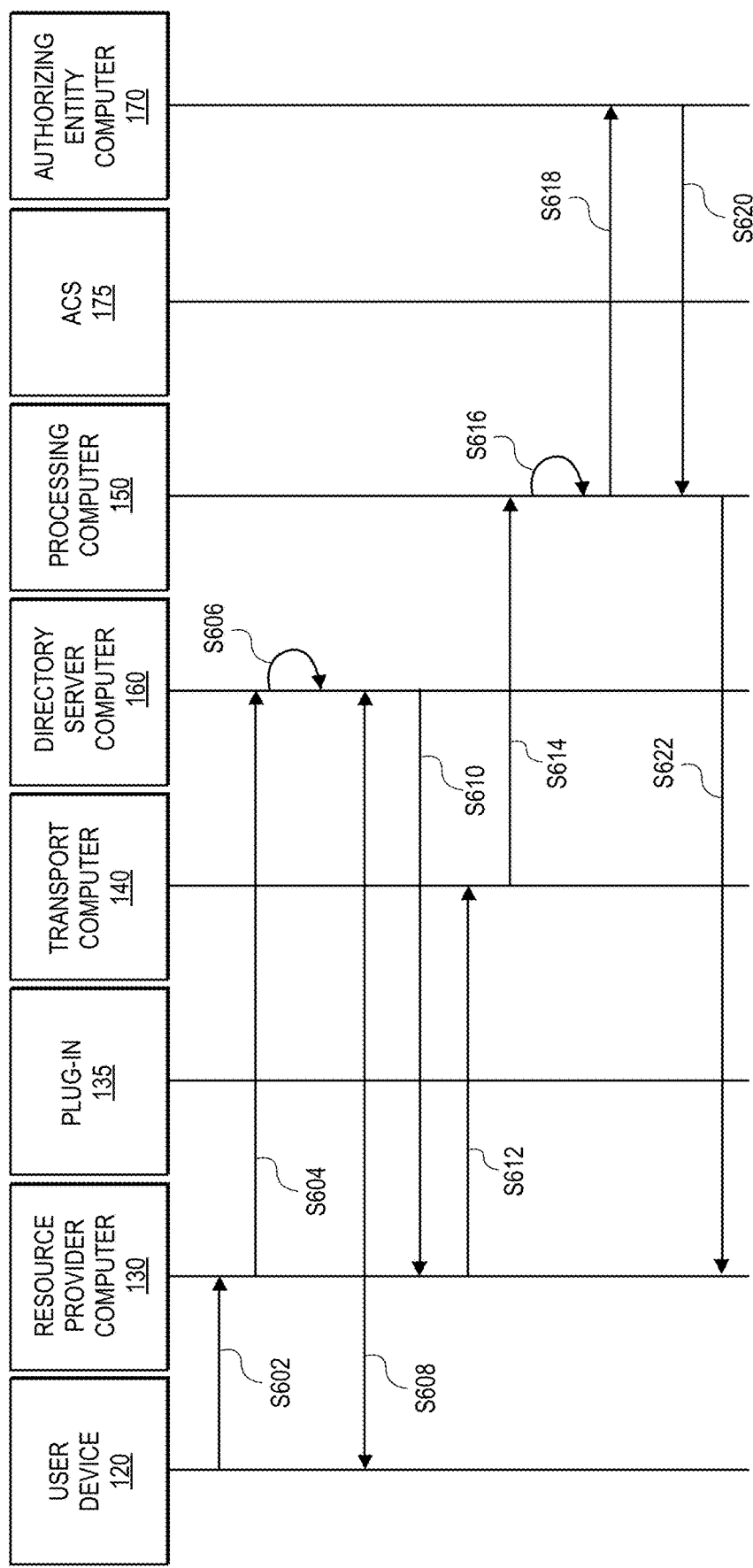
FIG. 6 shows a swim lane diagram of subsequent authentication and authorization of a trusted listing according to embodiments.

FIG. 6 shows authentication and authorization of an interaction between a user and a resource provider that is trusted by the user, after enrollment. Subsequent interactions between the user and the resource provider may make use of the trusted listing.

In step S602, the user may use the user device 120 to initiate a transaction with the resource provider. The user device 120 may send an account identifier (e.g., a PAN, token, credentials) to the resource provider computer 130. The user device 120 may additionally, or alternatively, send a user identifier (e.g., a code, a phone number) that can be mapped to the account identifier.

In step S604, the resource provider computer 130 can send an authentication request message, including the resource provider identifier and the account identifier, to a directory server computer 160. The authentication request message may be sent by a plug-in 135 of the resource provider computer 130. The authentication request message may include the trusted marker. The authentication request message may also include additional data such as a verification value (e.g., CAVV, TAVV). If the user device 120 provides the user identifier, and the user has stored credentials (e.g., a PAN, an account number) with the resource provider, the resource provider computer 130 may map the user identifier to an account identifier (e.g., the stored credentials). In some embodiments, the resource provider computer 130 can request a token, and may receive a trusted listing token.

In step S606, the directory server computer 160 can validate that the resource provider is trusted by the user. The directory server computer 160 may use the resource provider identifier and account identifier (or user identifier) to query a trusted listing database and determine that data indicating that the resource provider is trusted is present. Such data may include, for example, a flag, a date that the trusted listing was established, a trusted marker, or some other data field. The directory server computer 160 may communicate with a processing computer 150 to query the trusted listing database. If the authentication request message includes a trusted marker, the directory server computer 160 may validate that the resource provider is trusted by the user by validating the trusted marker. The directory server computer 160 may validate the trusted marker by querying the trusted listing database for the data representing that the resource provider is trusted by the user. The directory server computer 160 may then add a validated trusted marker to the authentication request message after validating that the resource provider is trusted by the user. The trusted marker can be validated by signing the trusted marker with a secret key held by the directory server. The directory server computer 160 may additionally, or alternatively, add a flag to the authentication request message indicating that the trusted marker is valid.

In step S608, the directory server computer 160 may provide a second level of authentication of the user. In some embodiments, the directory server computer 160 may authenticate the user directly and generate an authorization response message indicating that the user is authenticated. In other embodiments, the directory server computer 160 may send the authentication request message with a validated trusted marker to an ACS 175. If the ACS 175 receives an authentication request with a validated trusted marker, the ACS 175 may use a second level of authentication to challenge the user. The second level of authentication may be lower than the first level of authentication. For example, if the first level of authentication involves challenging the asking user for a password, the second level of authentication may involve the ACS 175 collecting device data from the user device 120. The second level of authentication may also be no authentication. Based on the result of the authentication, the ACS 175 can generate a validated trusted marker and can generate the authentication response message indicating that the user is authenticated.

In step S610, the directory server computer 160 can send the authentication response message to the resource provider computer 130 indicating that the user is authenticated. The authentication response message may indicate to the resource provider that the user was authenticated at the second level of authentication. The authentication response message may also include the validated trusted marker. The authorization response message may be sent through the plug-in 135.

In step S612, the resource provider computer 130 can send an authorization request message to a transport computer 140. The transport computer 140 may be operated by an acquirer of the resource provider. The authorization request message may include the validated trusted marker, the user identifier, the resource provider identifier, and transaction information (e.g., a transaction amount, a time stamp). The authorization request message may be sent by the plug-in 135. In some embodiments, the authorization request message may include a trusted listing token of the user and/or a cryptogram with the trusted marker. In other embodiments, the resource provider may submit a subsequent stored credential transaction message. The stored credential transaction message may include fields for TAVV and POS Entry Mode 10 (stored credential transaction). The authorization request message may additionally include an electronic commerce indicator (ECI) and a CAVV.

In step S614, the transport computer 140 can send the authorization request message to a processing computer 150. The processing computer 150 may be part of a payment processing network.

In step S616, the processing computer 150 can validate the trusted marker from the resource provider computer 130. If the trusted marker is a validated trusted marker, the processing computer 150 may decrypt a validated trusted marker. If the trusted marker is not a validated trusted marker, the processing computer 150 may use the resource provider identifier and account identifier to query the trusted listing database and determine that data indicating that the resource provider is trusted is present. The processing computer 150 may add a validated trusted marker to the authorization request message after validating that the resource provider is trusted by the user. The processing computer 150 may additionally, or alternatively, add a flag to the authorization request message indicating that the trusted marker is valid. The processing computer 150 may add a flag to the authorization request message in addition to validation done by the directory server computer 160. The flag added by the processing computer 150 may also depend on the MVV. For example, the resource provider may need to have a particular MVV indicating that the resource provider is able to be a trusted listing. Additionally, or alternatively, the flag may depend on the MVV having a value associated with a particular resource provider type. For example, trusted listing requirements for airlines may be different than that for coffee shops. The flag and/or the validated trusted marker may have been added during the prior authentication process. Based on the CVM, the processing computer 150 may include a CVM indicator in the authorization request message. For example, the resource provider may have first verified the user at the beginning of the interaction by requesting a PIN. The processing computer 150 may then include a CVM indicator to indicate that a PIN was used. In some embodiments, the processing computer 150 may check a TAVV and user's trusted listing status with the token and resource provider identifier as part of token processing.

In step S618, the processing computer 150 can send the authorization request message to an authorizing entity computer 170. The authorization request message may include the flag indicating that the trusted marker is valid and/or the validated trusted marker, in addition to including transaction information (e.g., the transaction amount, the time stamp), the user identifier, and the resource provider identifier.

In step S620, the authorizing entity computer 170 may receive the authorization request message and process the transaction. The authorizing entity computer 170 can approve or deny the authorization request. The authorizing entity computer 170 may be more likely to approve authorization requests with a trusted marker, as it may indicate that the transaction is low-risk. Even though the resource provider is trusted by the user, the authorizing entity computer may still decline the authorization request, for example due to indicators of potential fraud. For example, the transaction can be for a higher than usual amount (e.g., $1000 instead of $20) or may originate from an unusual location (e.g., Russia instead of the United States). The authorizing entity computer 170 may then generate an authorization response message including an authorization decision (e.g., approved, denied). The authorizing entity computer 170 can then send an authorization response message to the processing computer 150.

In step S622, the processing computer 150 can send the authorization response message to the transport computer 140, and then the transport computer 140 may send the authorization response message to the resource provider computer 130. If the authorization is declined, the resource provider computer 130 may have the option to re-attempt the transaction. The resource provider may be advised to request additional user authentication, which may include strong authentication (e.g. 3DS authentication).

In some embodiments, even if a resource provider is a trusted listing for a user, the resource provider may be able to request additional authentication of the user in subsequent transactions. For example, the resource provider may desire strong authentication for high value transactions (e.g., any transaction over $1000) and/or a high volume of transactions (e.g., more than three transactions from the same user in one day). The resource provider may be able to request strong authentication by not including the trusted marker in the authentication request message. Additionally, or alternatively, the resource provider may include a flag in the authentication request message indicating that additional authentication is requested. The user may then be authenticated at the first level of authentication, or at some of level of authentication that is higher than the second level of authentication.

As detailed above, embodiments of the invention may integrate with a variety of existing transaction and authentication systems, including 3D Secure, secure remote commerce (SRC), and stored credential transaction processes, to provide the advantages of trusted listings. Embodiments can use a trusted listing request flag in strong authentication messages to indicate a trusted listing request and force step-up authentication. A strong authentication service provider may integrate with a token service system such as Visa Token Service to retrieve a trusted listing token upon completion of strong authentication. SRC may allow resource providers to broadly deploy tokenization across their stored credentials. As users initiate transactions, the tokens can become trusted listing tokens, thereby efficiently converting tokens without requiring additional computational resources. Resource providers can have a combination of SRC tokens and trusted listing tokens. SRC tokens by themselves may not qualify for exemption from strong authentication requirements, and may have to either be authenticated or qualify for other exemption options (low value, low risk).

Once a resource provider is established as a trusted listing for a user, entities such as the user, the ACS, or the authorizing entity can manage the trusted listing status and/or account identifiers associated with the trusted listing. For example, an ACS may update a PAN associated with a user in the trusted listings that the user has after the PAN is replaced as part of credential life cycle management. As another example, the user and/or ACS may want to delete the trusted listing if the trusted relationship with the resource provider is no longer requested. If trusted listing status is removed from a token, the token may be downgraded (e.g., to a standard SRC token), and may no longer qualify for a trusted listing exemption for strong authentication.

In some embodiments, the trusted listing management may be initiated by the user. For example, the user may be able to manage their trusted listings through a website or mobile application (e.g., an issuer website) associated with an authorizing entity computer (e.g., an authorizing entity computer operated by an issuer). The issuer site may display a list of resource providers trusted by the user and may provide options for managing the trusted listing status of each resource provider. Options may include removing trusted listing status, updating an account identifier associated with a trusted listing, and adding a new resource provider as a trusted listing.

In one embodiment of user initiated trusted listing management, the user may first access an issuer site operated by an issuer with an authorizing entity computer. The user may authenticate themselves to the issuer site through any appropriate method. For example, the user may enter a password and/or biometric measurement. The user may also be asked to submit an account identifier (e.g., a PAN, an account number) or a user identifier (e.g., a phone number). In some embodiments, the authorizing entity computer may use the user identifier to retrieve an account identifier for the user, such as a PAN. The user may then access a list of trusted resource providers and/or resource providers that can be added as trusted listings. The user can indicate the trusted listing status change that they would like to make. For example, the user may indicate that they would like to remove trusted listing status for Joe's Clothes. The authorizing entity computer may then generate a trusted listing status update message to add or remove trusted listing status for a resource provider. The trusted listing status update request may include the account identifier or the user identifier, a resource provider identifier for the selected resource provider, and an indicator of the desired trusted listing status change.

The authorizing entity computer may then submit the trusted listing status update message to a processing computer. The trusted listing status update message may alternatively be sent to a directory server.

Then, the processing computer may update a trusted listing database with the trusted listing status change. The processing computer may use the user identifier and/or account identifier, and the resource provider identifier to query the trusted listing database. The processing computer may then send a confirmation message to the authorizing entity computer, indicating that the desired trusted listing status update has been made. The issuer may then communicate the trusted listing status change to the user through the issuer site.

In other embodiments, trusted listing management may be initiated by an authenticating entity (e.g., an ACS, an authorizing entity, an issuer) directly. For example, an issuer may send a trusted listing status update to the processing computer to remove all trusted listing status for a resource provider found to be fraudulent. The authenticating entity may also periodically remove trusted listing status for resource providers (e.g., after one year) to ensure trusted listings stay current. In some systems that have deployed tokenization, the authenticating entity may have deployed token life cycle management APIs. These token life cycle management APIs may be used to also manage trusted listing tokens. Alternate life cycle management options may be available for authenticating entities that have not yet deployed tokenization, such as deploying life cycle management via a strong authentication service provider. Life cycle management of credentials associated with trusted listings may be facilitated by a payment processing network.

Figure 7A:
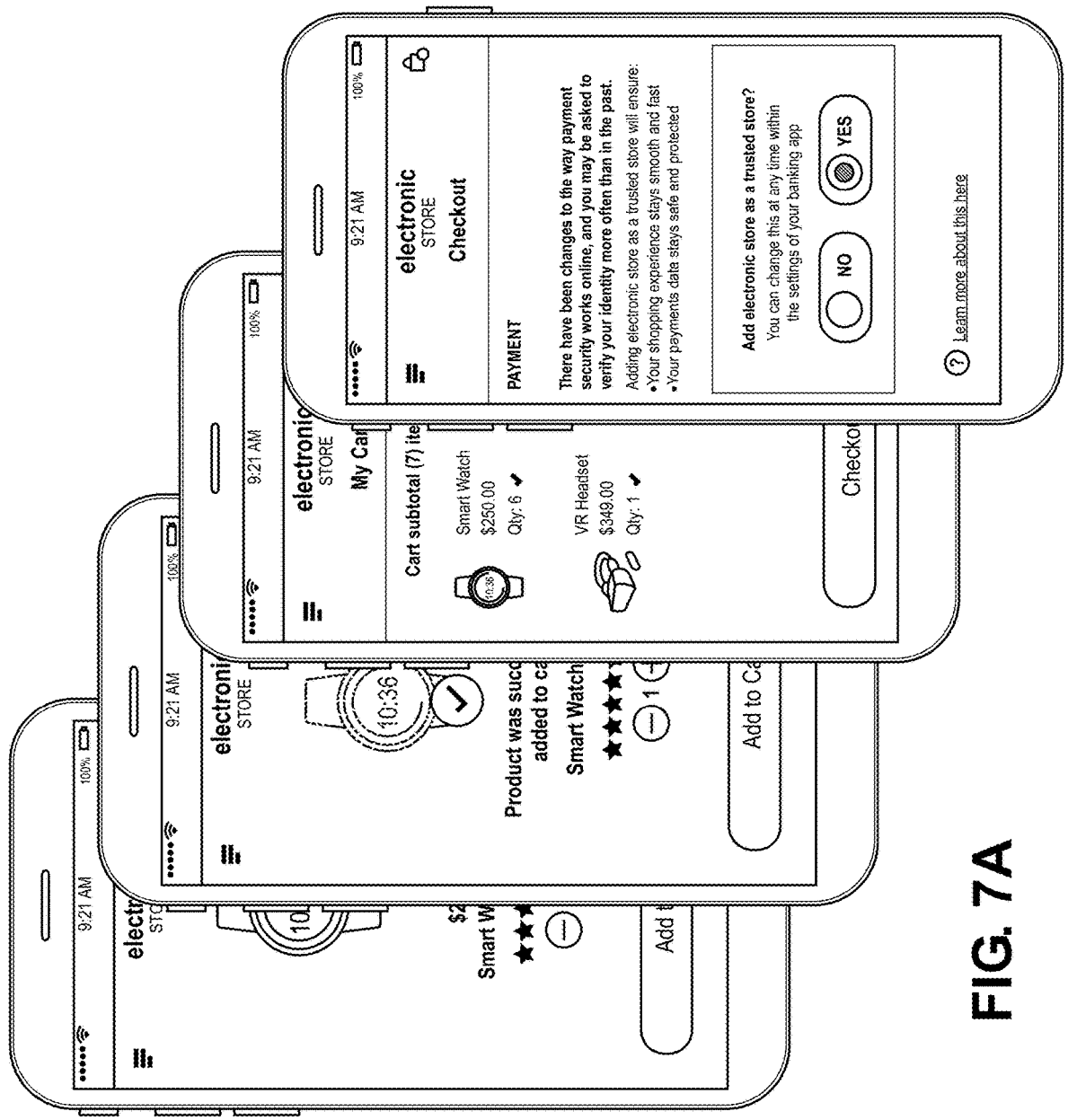
FIGS. 7A, 7B, and 7C show exemplary screen shots of a transaction according to embodiments.
Figure 7B:
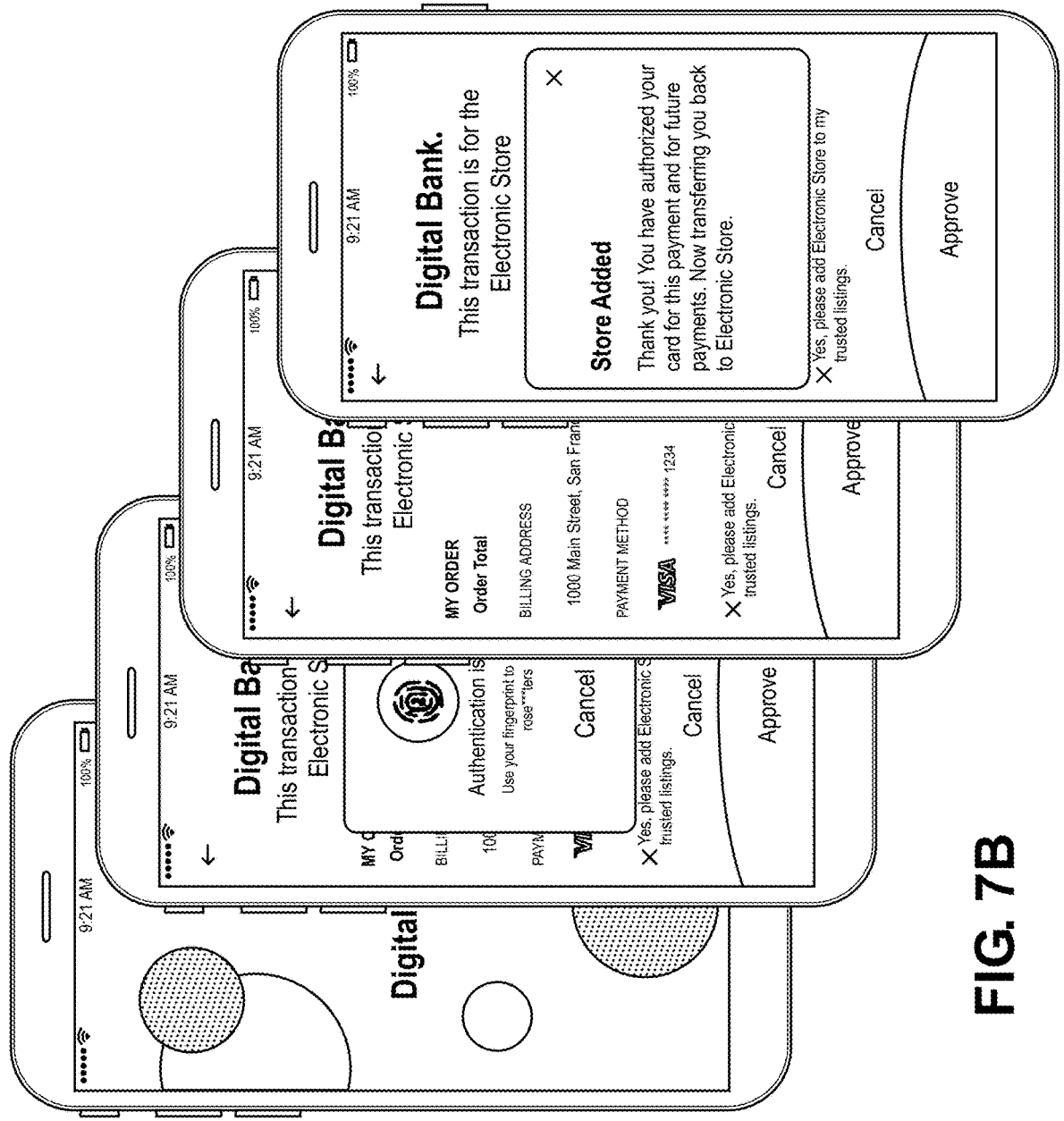
Figure 7C:
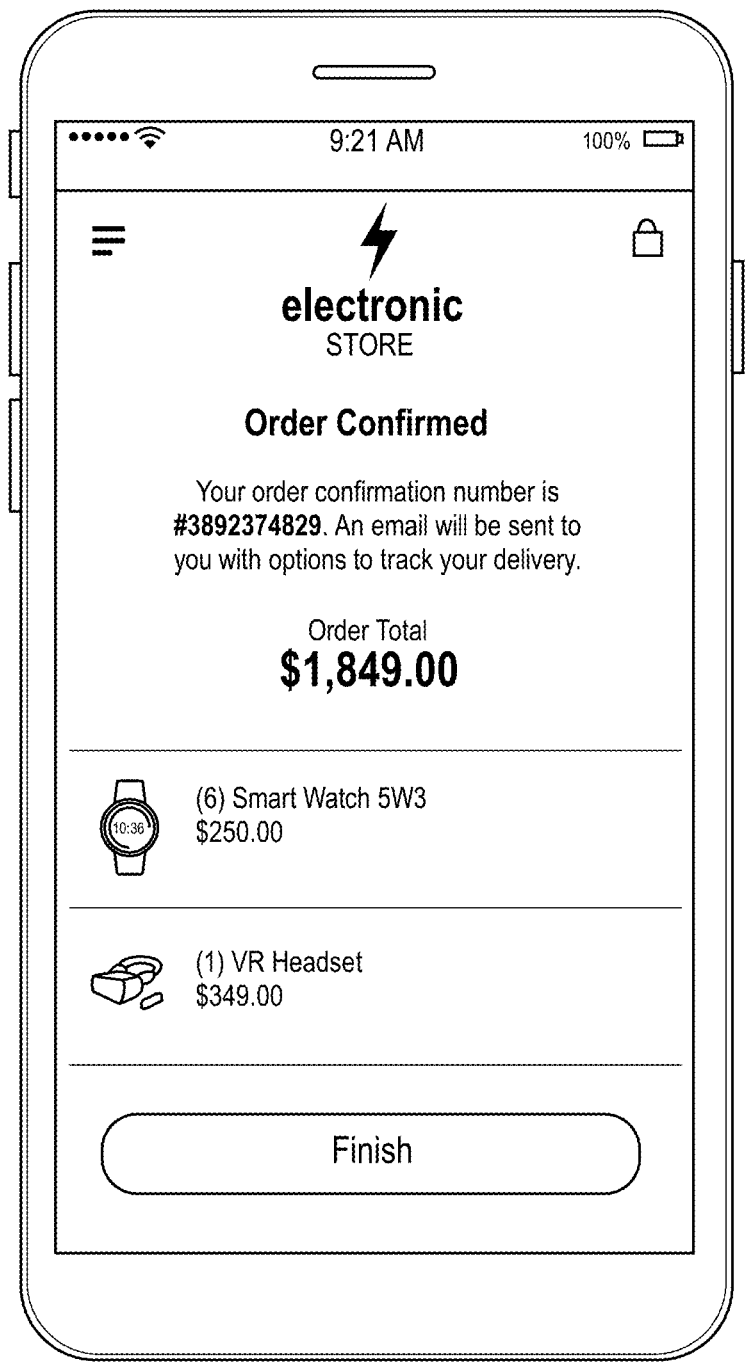

FIGS. 7A-C show a set of screenshots for a process of adding a resource provider as a trusted listing during a transaction, according to embodiments. FIG. 7A shows a set of screenshots on a resource provider site. The resource provider site may display a prompt for the user to add the resource provider as a trusted listing. The trusted listing prompt may appear after the user has entered payment information such as payment credentials or a token. The user may then be directed to an issuer site, as depicted in FIG. 7B. The user may be asked to authenticate themselves, for example, by entering a fingerprint for biometric authentication. The user may be able to confirm that they wish to add the resource provider as a trusted listing. The user may also complete the transaction payment at the issuer site. The user may then be directed back to the resource provider site, depicted in FIG. 7C, to receive a confirmation of the completed transaction.

Figure 8:
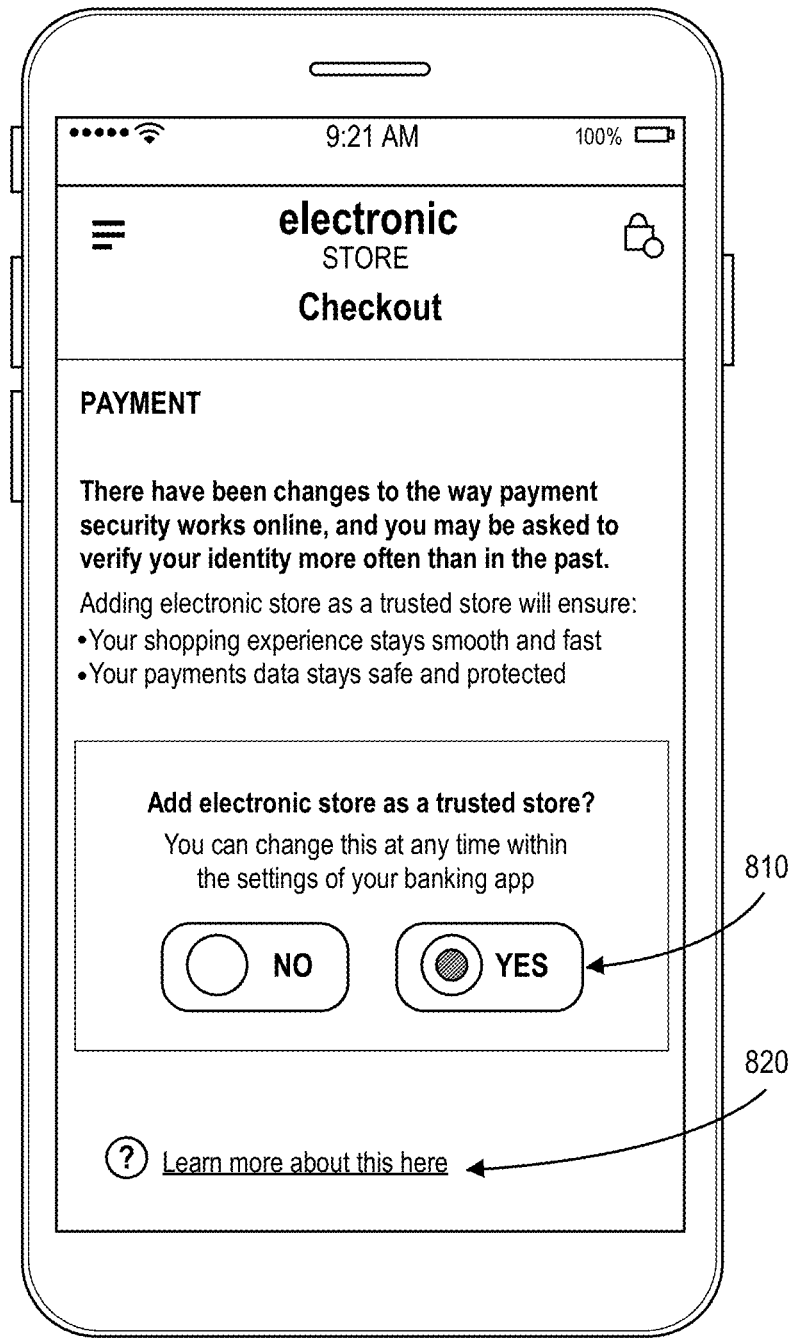
FIG. 8 shows an exemplary screen shot of a resource provider site according to embodiments.

FIG. 8 shows a screenshot of a resource provider site according to embodiments. The resource provider site may be the resource provider site of FIG. 7A. The resource provider site may display a prompt that the resource provider is requesting to be added as a trusted listing. The resource provider site may also allow a user to select if they wish to trust the resource provider. For example, there may be radio buttons 810 to select between adding the resource provider as a trusted listing and not adding the resource provider as a trusted listing. In other embodiments there may be, for example, a slider, dropdown list, or checkbox to select adding the resource provider as a trusted listing. There may also be information about the trusted listing process, including benefits to the user. The resource provider site may provide a way to access additional information about trusted listing. For example, there may be a link 820 to a website with additional information.

Figure 9:
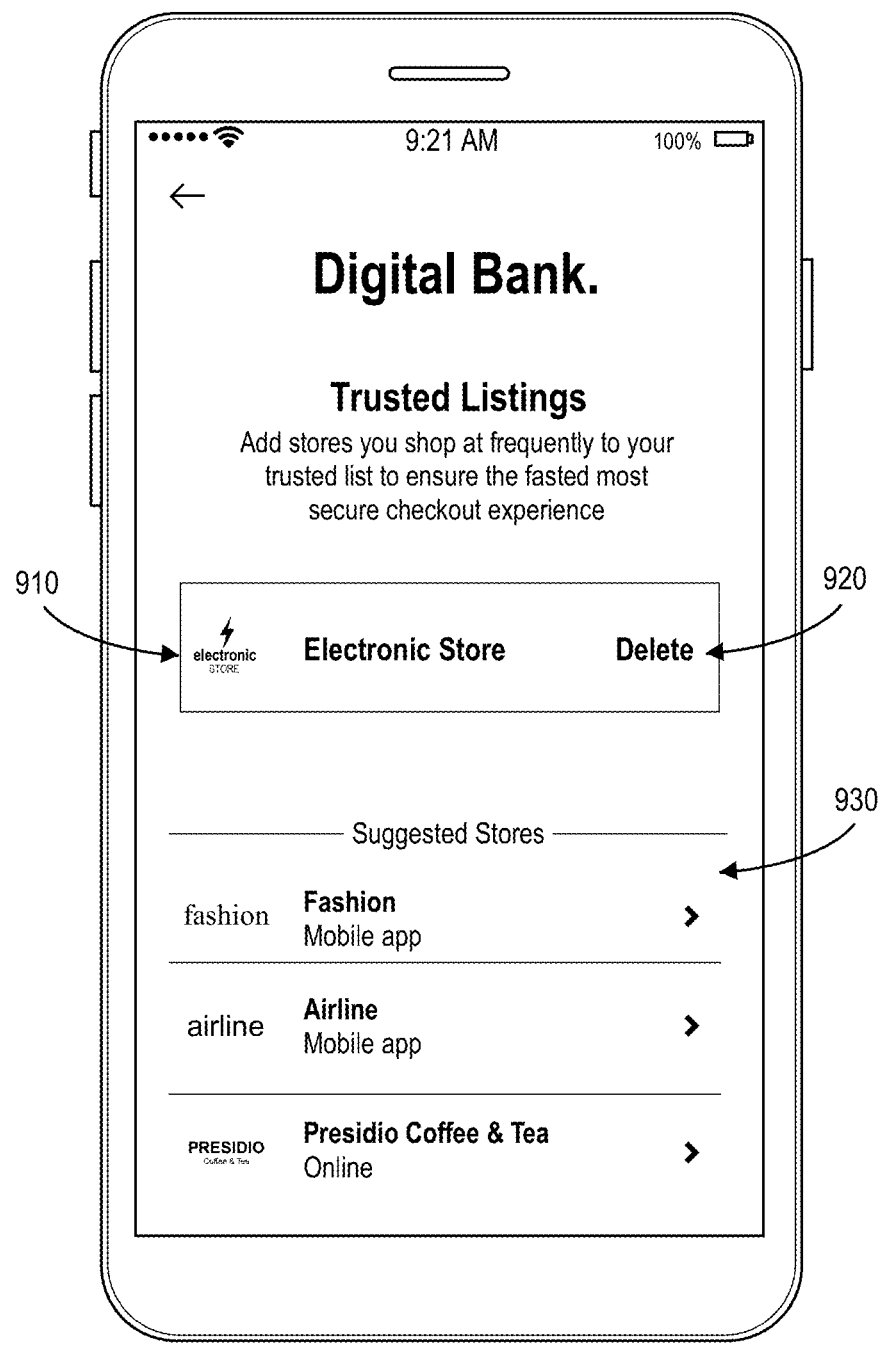
FIG. 9 shows an exemplary screen shot of an issuer site according to embodiments.

FIG. 9 shows a screenshot of an issuer site used in trusted listing management according to embodiments. A user may access the issuer site after authenticating themselves. The issuer site may show a list 910 of resource providers trusted by a user. The list 910 may show identifying data of each trusted resource provider, such as a name or logo of the resource provider. Selecting the resource provider from the list 910 may open additional information and options for the trusted listing. The issuer site may also present an option 920 to remove the resource provider as a trusted listing. The issuer site may also present a suggested list 930 of other eligible resource providers to add as trusted listings. Selecting a resource provider from the suggested list 930 may initiate enrollment for that resource provider.

Embodiments of the invention provide a number of advantages. By reducing the level of authentication for a resource provider that is a trusted listing, fewer authentication process steps, particularly fewer user-involved authentication steps, can be performed as compared to the situation where a user is authenticated at a high level each and every time a transaction is conducted. This saves on computing resources and processing power.

Coupling trusted listings with a stored credential transaction framework may provide additional advantages. Embodiments may enable trusted listings for SRC and stored credential resource providers and may not require new integration efforts for existing token service systems. Embodiments may enable authorizing entities to manage trusted listings easily, for example, via existing token life cycle management APIs or File update ISO messages, and may enable resource providers to validate trusted listing status using existing ISO messages and/or enhanced token service APIs.

Embodiments of the invention may build upon token processing, which can be complex for transactions that are not processed by specific processing computers. Some systems have established token-exchanges to support interoperability. Authorizing entity participation may be optional, but could be encouraged by using existing strong authentication processing as the primary method to implement and support.

Any of the software components or functions described in this application, may be implemented as software code to be executed by a processor using any suitable computer language such as, for example, Java, C++, or Perl using, for example, conventional or object-oriented techniques. The software code may be stored as a series of instructions, or commands on a computer-readable medium, such as a random access memory (RAM), a read only memory (ROM), a magnetic medium such as a hard-drive, or an optical medium such as a CD-ROM. Any such computer-readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a directory server computer, an authentication request message from a user conducting an interaction at a resource provider computer operated by a resource provider;
determining, by the directory server computer, that data representing an indication that the resource provider is trusted by the user is present in a database, the data comprising a trusted marker;
in response to the determining that the data comprising the trusted marker is present, providing, by the directory server computer, an authentication to the user with respect to the interaction;
sending, by the directory server computer to the resource provider computer, information indicating that the user has been authenticated and the trusted marker;
receiving, by a processing computer, an authorization request message for the interaction from the resource provider computer, the authorization request message comprising the trusted marker received by the resource provider computer from the directory server computer;
validating, by the processing computer, the trusted marker; and
sending, by the processing computer, the authorization request message comprising information related to the interaction and the validated trusted marker to an authorizing entity computer.

2. The method of claim 1, further comprising:
prior to the receiving the authentication request message, receiving, by the directory server computer, the indication that the resource provider is trusted by the user;
providing, by the directory server computer, a first level of authentication to the user; and
storing, by the directory server computer in the database, the data representing the indication that the resource provider is trusted, wherein the first level of authentication is provided to the user before the storing of the data,
wherein the providing the authentication to the user further comprises providing a second level of authentication that is lower than the first level of authentication before the user is allowed to complete the interaction.

3. The method of claim 2, wherein the second level of authentication is no authentication.

4. The method of claim 2, wherein the providing the first level of authentication comprises initiating an authentication process, during which the user is requested to input a password.

5. The method of claim 2, wherein:
the providing the first level of authentication comprises requesting the user to input a password, and
the providing the second level of authentication further comprises:
collecting device data of a device operated by the user, and
authenticating the user based on the device data.

6. The method of claim 1, wherein the resource provider computer stores an account identifier for an account of the user.

7. The method of claim 6, wherein the interaction is a stored credential transaction.

8. The method of claim 1, wherein the authentication request message includes a resource provider identifier of the resource provider and a verification value of the user.

9. The method of claim 1, wherein the indication that the resource provider is trusted is received from the resource provider computer.

10. The method of claim 1, wherein the indication that the resource provider is trusted is received from the authorizing entity computer.

11. A directory server computer comprising:
a processor; and
a computer-readable medium, coupled to the processor, the computer-readable medium comprising code which, when executed by the processor, causes the processor to perform a method including:
receiving an authentication request message from a user conducting an interaction at a resource provider computer operated by a resource provider;
determining that data representing an indication that the resource provider is trusted by the user is present in a database, the data comprising a trusted marker;
in response to the determining that the data comprising the trusted marker is present, providing an authentication to the user with respect to the interaction; and
sending, to the resource provider computer, information indicating that the user has been authenticated and the trusted marker,
wherein:
the resource provider computer sends, to a processing computer, an authorization request message for the interaction, the authorization request message comprising the trusted marker received by the resource provider computer from the directory server computer, and
the processing computer validates the trusted marker, and sends the authorization request message comprising information related to the interaction and the validated trusted marker to an authorizing entity computer.

12. The directory server computer of claim 11, wherein the resource provider computer stores an account identifier for an account of the user.

13. The directory server computer of claim 12, wherein the interaction is a stored credential transaction.

14. The directory server computer of claim 12, wherein the method further includes:
prior to the receiving the authentication request message, receiving the indication that the resource provider is trusted by the user;
providing a first level of authentication to the user; and
storing the data representing the indication that the resource provider is trusted in the database, wherein the first level of authentication is provided before the storing of the data,
wherein the providing the authentication to the user further includes providing a second level of authentication that is lower than the first level of authentication before the user is allowed to complete the interaction.

15. The directory server computer of claim 14, wherein the second level of authentication is no authentication.

16. The directory server computer of claim 14, wherein the providing the first level of authentication includes initiating an authentication process during which the user is requested to input a password.

17. The directory server computer of claim 11, wherein the authentication request message includes a resource provider identifier of the resource provider and a verification value of the user.

18. The directory server computer of claim 11, wherein the indication that the resource provider is trusted is received from the resource provider computer.

19. The directory server computer of claim 11, wherein the indication that the resource provider is trusted is received from the authorizing entity computer.

20. A system comprising:
a directory server computer comprising a first processor and a first computer-readable medium comprising code which, when executed by the first processor, causes the first processor to perform operations including:
receiving an authentication request message from a user conducting an interaction at a resource provider computer operated by a resource provider;
determining that data representing an indication that the resource provider is trusted by the user is present in a database, the data comprising a trusted marker;
in response to the determining that the data comprising the trusted marker is present, providing an authentication to the user with respect to the interaction; and
sending, to the resource provider computer, information indicating that the user has been authenticated and the trusted marker; and
a processing computer comprising a second processor and a second computer-readable medium comprising code which, when executed by the second processor, causes the second processor to perform operations including:
receiving an authorization request message for the interaction from the resource provider computer, the authorization request message comprising the trusted marker having been received by the resource provider computer from the directory server computer;
validating the trusted marker; and
sending the authorization request message comprising information related to the interaction and the validated trusted marker to an authorizing entity computer.

* * * * *